United States Patent

Wasson

[15] 3,673,696
[45] July 4, 1972

[54] ATTITUDE INDICATOR

[72] Inventor: Gene B. Wasson, 1553 Gamon Road, Wheaton, Ill. 60187

[22] Filed: Feb. 22, 1971

[21] Appl. No.: 117,352

[52] U.S. Cl. ................................. 33/348, 33/370, 33/379
[51] Int. Cl. ............................................................ G01c 9/00
[58] Field of Search .............. 33/206 R, 207 R, 212 R, 222 R, 33/223 R

[56] References Cited

UNITED STATES PATENTS

| | | | |
|---|---|---|---|
| 2,362,872 | 11/1944 | Weagle | 33/211 |
| 2,871,573 | 2/1959 | Schenker | 33/207 R |
| 3,269,729 | 8/1966 | Morrison | 33/212 R |

FOREIGN PATENTS OR APPLICATIONS

| | | | |
|---|---|---|---|
| 789,942 | 1/1958 | Great Britain | 33/223 |
| 795,255 | 5/1958 | Great Britain | 33/223 |
| 83,429 | 4/1957 | Denmark | 240/6.44 |

Primary Examiner—Leonard Forman
Assistant Examiner—Charles E. Phillips
Attorney—Frank J. Foley

[57] ABSTRACT

An attitude indicator, or detector, having a circular, annular transparent tube containing a liquid, preferably colored, and a gas bubble, the tube being shaped and constructed for encircling and for fastening non-rotatably upon the forearm and perpendicularly to the length of the forearm of a diver. The position of the bubble in the tube, responsive to the forces of gravity, enables the diver to determine at any moment the attitude, or angular position, of the tube with reference to the planes or lines of gravitational forces, the attitude of his forearm and body, and by visual comparison with the tube the attitude of visible nearby structures and surfaces, and, as well, the attitude of his existing or any contemplated line of travel. Illumination of the tube and its contents, preferably constantly, is provided by means of a light emitter such as radium or other light emitting substance, whereby the bubble may be viewed conveniently and frequently and its location comprehended instantaneously by the diver, whether he be in open waters or in dark areas or in murky waters.

9 Claims, 6 Drawing Figures

PATENTED JUL 4 1972 3,673,696
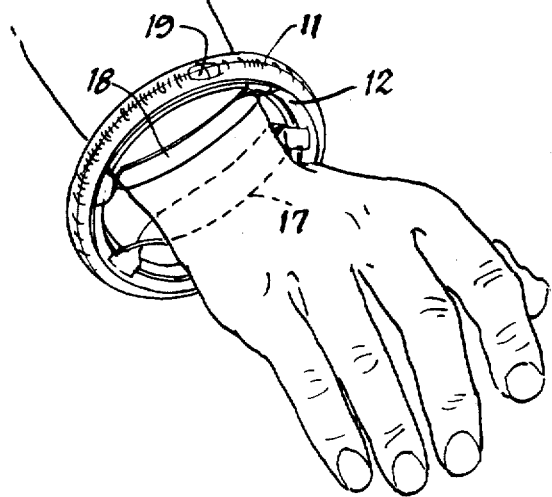
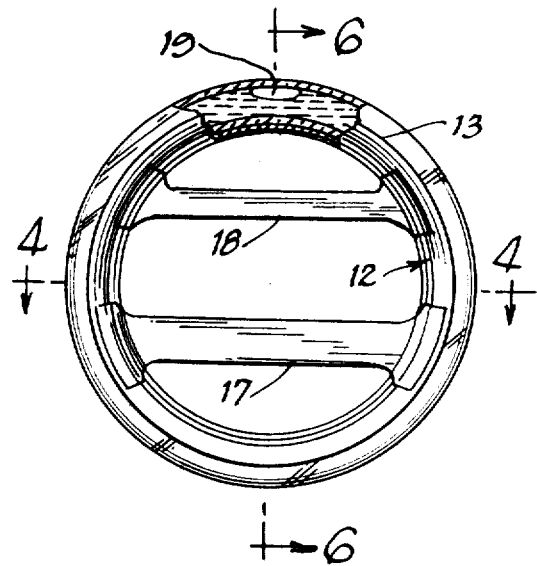
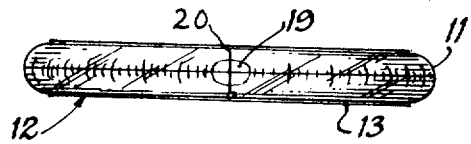
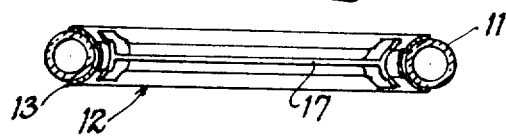
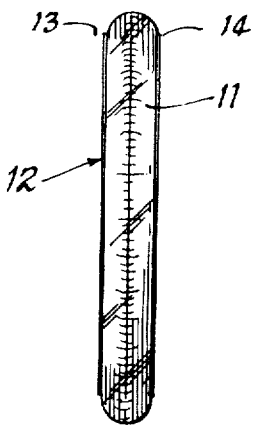
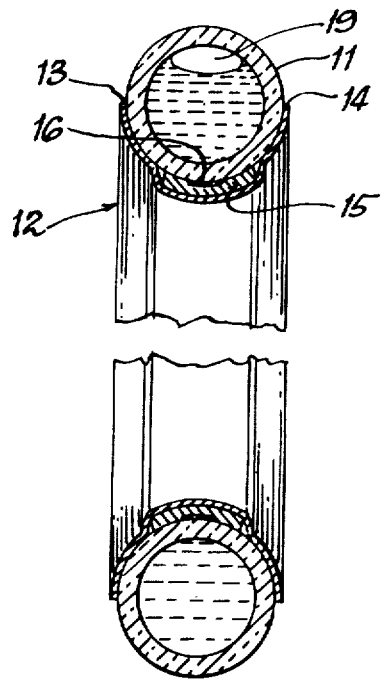
INVENTOR
Gene B. Wasson
by Frank J. Foley
Att'y

ATTITUDE INDICATOR

This invention pertains to attitude indicators, which make it possible for a submerged diver, such as a scuba diver, or any diver, to quickly ascertain, first, the angular attitude of the indicator tube itself with reference to vertical planes or lines of gravitational forces, and then from that information to determine, for one common example, which direction of movement would take him most quickly to the surface, should he then desire or need to surface.

The weight and the nature of his diving gear gives a diver a net buoyancy and sometimes an unfamiliar center of buoyancy different from that he would have without the gear. His response to gravity may therefore be unusual and uncertain. At times he may unknowingly be swimming downwardly or upwardly, on his side or even on his back, especially in darkness and where he has no visible points of reference.

At depths from which overhead daylight, if any, is absent or does not penetrate, in water discolored by sediment, or otherwise, in caves, tunnels, and within opaque structures, such as sunken vessels, a diver may and often does become uncertain of his attitude with respect to visible points of reference or with respect to invisible lines or planes of gravitational forces. He may also need to know the attitude or angularity of surfaces beneath him, above him and laterally of him.

In still waters, large air bubbles, when discernible, escaping from his breathing apparatus and rising vertically are sometimes a good guide as to which direction is vertical and upward. But, water currents arising from tides and other causes make that guide unavailable, and new oxygen apparatus may not even yield large, discernible bubbles.

Hence, instant acquisition of dependable knowledge of or as to his attitude may often be needed, especially if his oxygen supply is low, lest doubt give way to panic, and panic to disaster.

One of the objects of this invention is to provide a submerged diver with a device enabling him to determine, without aid from any other information source, his attitude, or posture with reference to gravitudinal forces.

Another object of the invention is to provide a tubular, annular device, containing a liquid and a gas bubble, and means for affixing the device so that it encircles the forearm of a diver.

Another object of the invention is to provide on said annular device, means whereby the diver may determine when and whether the lateral sides of the annular member are extended in vertical planes.

Another object of the invention is to provide an attitude indicating device having the foregoing advantages and so that it is movable by the arm to various positions accessible for viewing and for revealing various different kinds of attitude information.

Other objects and advantages of the invention will be mentioned hereinafter, or will become apparent in the following description.

Referring now to the drawing showing one embodiment of the invention,

FIG. 1 is a perspective view, on a reduced scale, showing the attitude indicator encircling the bare arm, omitting the conventional diving suit.

FIG. 2 is a side elevation of the device.

FIG. 3 is a top plan view of the indicator.

FIG. 4 is a sectional view on line 4—4 of FIG. 2.

FIG. 5 is a side edge view of the tubular indicator.

FIG. 6 is a sectional view on a larger scale, showing details of the structure.

The endless tube 11 should be circular in circumference and circular in cross section and may be made from various materials, such as glass, or an acrylic plastic material which should be substantially incompressible at expected under water pressures, and may, preferably, be flexible so that it will fit snugly in its casing, generally indicated as 12. Other materials may be used, but in any event, the tube should be transparent.

The opposite peripheral portions of the annular casing 12 terminate in margins 13 and 14 supporting and embracing the tube 11 as shown. These margins should be equal in circumference and radius about a common axis, leaving exposed about half of the surface of the tube, as shown.

The casing 12 may be made of light, strong metal, or other suitable material, and is expanded away from the tube to enclose a radiation shield 15 of lead, which affords cover for a stripe 16 of radium, painted or otherwise applied to the tube 11, as shown.

For securing the annular attitude indicator non-rotatably upon the diver's forearm, any suitable means may be employed. For example, rubber bands 17 and 18 may be adhesively secured to the inner surface of casing 12, and the diver may slide his rubber-covered forearm between the rubber bands, which will prevent the indicator from rotating.

FIG. 6 shows the bubble 19 located at the top of the tube and equidistant from the casing margins 13 and 14, thus showing a condition when the lateral sides of the indicator are vertical. Hence, an imaginary line passing through the center of the indicator and the center of the bubble will be exactly vertical and parallel to the lines of gravitational force. In actual use, the diver may often and easily make this observation of vital information. If the indicator be tilted laterally out of vertical a considerable extent, the diver still can see the bubble between the margins, and become aware of that fact.

It will readily be perceived that the bubble 19, responsive to gravity acting on the surrounding liquid in the tube is highly mobile and instantly responsive. There will be no lag or delay in it revealing to the diver many facts he needs to learn instantly. As his forearm is also highly mobile and is the carrier of the indicator and is a most familiar appendage, he can quickly check on the posture or attitude of his body, the angular inclination of his existing or any proposed line of travel, and the angular position of nearby surfaces above, or below, or laterally adjacent to him, in which he may have an interest and, perhaps, a vital need to ascertain such information.

By having a tube with a 360° arc, the bubble will never be trapped in a dead end passage, as might happen if the arc were less than 360°.

Indicia markings by line, accompanied by some degree numerals, as desired, applied to the tube or to the adjacent casing margins, either side of the zero line 20, will enable the diver to compute angles in connection with data which he may be seeking.

When an uncolored gas, such as air, constitutes the bubble it is highly desirable that the tube liquid have a pre-selected color different from the color of the waters which the diver, on any venture, may expect to encounter. The contrast in colors will make the bubble more visible, and the selected color should not be so dark as to unnecessarily diminish the lighting of the liquid surrounding the bubble within the tube.

Any suitable method for filling the tube with the liquid, accompanied by a bubble, may be employed.

As a further illustration of the use of the attitude indicator of this invention, it may be noted that by bending his forearm at the elbow, the diver may view the indicator as it is viewed in FIG. 6. If the bubble be centered between the casing margins 14 and 15, which are of equal diameter, the diver then knows that the planes of the sides of the tube are vertical and parallel to the lines of gravitational forces.

Furthermore, his palm, when extended straight from the forearm, always rotates in unison with his forearm. Hence, his palm may be used for angle measuring by moving the palm to make it parallel with any nearby upright, or non-upright, surface, and by looking at the bubble and at degree markings on the tube, or on its casing 12, he can estimate the angular attitude of any such surface with reference to gravitational lines of force, or with reference to some other surface, and can do this in the dark. In a similar manner, he can estimate, and remember, the angular attitude of any passage he proposes to enter, or has just left.

The term "light emitting material", as used herein, is intended to include materials other than radium, for example, phosphorescent and fluorescent materials, which emit and/or reflect light rays.

The invention is not limited to the details of the constructions herein disclosed, but includes such modifications as fall within the scope of the claims hereto appended.

Having shown and described my invention,

I claim:

1. An attitude indicator comprising
a circular annular tube containing a liquid and a bubble,
means for supporting and securing said tube in a position encircling the forearm of a diver,
and means including a light emitting material positioned adjacent the tube adapted for illuminating the contents of the tube.

2. An attitude indicator comprising
a circular annular tube containing a liquid and a bubble,
a circular annular frame proportioned for encircling the forearm of a diver and having confining surfaces adapted for supporting the tube with substantial peripheral surfaces transverse of the length of the tube exposed for viewing radially outside said confining surfaces,
means for securing the frame in said encircling position on the forearm of a diver,
and means including a light emitting material positioned adjacent the tube adapted for illuminating the contents of the tube.

3. An attitude indicator in accordance with claim 1, in which the light emitting material is positioned on the inner periphery of the tube and emits light radially into the tube.

4. An attitude indicator in accordance with claim 2, in which the light emitting means is positioned within said confining surfaces and emits light into the tube.

5. An attitude indicator in accordance with claim 1, in which the opposite lateral sides of the tube lie in parallel planes, and having means for the visual determination from the position of the bubble the angular attitude of said planes with reference to a vertical plane lying in the gravitational lines of force.

6. An attitude indicator in accordance with claim 1, in which the supporting and securing means secures the tube non-rotatably on the arm of the diver.

7. An attitude indicator in accordance with claim 1, in which the tube supporting means includes annular members on opposite lateral sides of the tube having peripheral margins of equal diameters which are substantially less than the outer peripheral diameter of the tube.

8. An attitude indicator in accordance with claim 1, including circular means adjacent opposite lateral sides of the tube having substantially lesser diameters than the outer peripheral diameter of the tube, to aid in visually determining by reference to the position of the bubble in the tube the angular attitude of the tube with respect to vertical lines of gravitational forces.

9. An attitude indicator in accordance with claim 2, in which means is provided in the frame for covering and protecting the light emitting material.

* * * * *